United States Patent
Kross et al.

(10) Patent No.: US 8,444,264 B1
(45) Date of Patent: May 21, 2013

(54) UPCONVERTING DEVICE FOR ENHANCED RECOGNTION OF CERTAIN WAVELENGTHS OF LIGHT

(75) Inventors: Brian Kross, Yorktown, VA (US); John (Jack) E. McKisson, Williamsburg, VA (US); John McKisson, Hampton, VA (US); Andrew Weisenberger, Yorktown, VA (US); Wenze Xi, Odenton, MD (US); Carl Zorn, Yorktown, VA (US)

(73) Assignee: Jefferson Science Associates, LLC, Newport News, VA (US)

( * ) Notice: Subject to any disclaimer, the term of this patent is extended or adjusted under 35 U.S.C. 154(b) by 7 days.

(21) Appl. No.: 13/066,898

(22) Filed: Apr. 27, 2011

(51) Int. Cl.
*G02C 5/00* (2006.01)
*G02C 1/06* (2006.01)
*G02C 5/06* (2006.01)

(52) U.S. Cl.
CPC .. *G02C 5/00* (2013.01); *G02C 1/06* (2013.01); *G02C 5/06* (2013.01); *Y10S 977/868* (2013.01); *Y10S 977/947* (2013.01); *Y10S 977/951* (2013.01)
USPC .............. 351/41; 977/868; 977/947; 977/951

(58) Field of Classification Search
USPC ........................... 977/868, 951, 947; 351/163
See application file for complete search history.

(56) References Cited

U.S. PATENT DOCUMENTS

| | | | |
|---|---|---|---|
| 7,008,559 B2 * | 3/2006 | Chen | 252/301.6 S |
| 2009/0201462 A1 * | 8/2009 | Gruber | 351/163 |
| 2011/0090453 A1 * | 4/2011 | Chen et al. | 351/163 |

FOREIGN PATENT DOCUMENTS

WO  WO 2005003841 A1 *  1/2005

OTHER PUBLICATIONS

Shan Jiang, et al. Optical image-guided Cancer Therapy with Flourscent Nanoparticles, Journal of the Royal Society Interface, 2010 (7) pp. 3-18, Sep. 16, 2009 (on line).

Scott A. Hilderbrand et al., Upconverting Luminescent Nanomaterials: Applications to In Vivo Bioimaging, Chem. Commun(Camb), (28), Jul. 28, 2009, pp. 4188-4190.

Vinegoni et al. Transillumination Fluorescence Imaging in Mice Using Biocompatible Upconverting Nanoparticles, Opt Lett. 34(17), Sep. 1, 2009, pp. 2566-2568.

* cited by examiner

*Primary Examiner* — Thomas K Pham
*Assistant Examiner* — Jie Lei

(57) ABSTRACT

An upconverting device for enhanced recognition of selected wavelengths is provided. The device comprises a transparent light transmitter in combination with a plurality of upconverting nanoparticles. The device may a lens in eyewear or alternatively a transparent panel such as a window in an instrument or machine. In use the upconverting device is positioned between a light source and the eye(s) of the user of the upconverting device.

7 Claims, 2 Drawing Sheets

UPCONVERTING DEVICE FOR ENHANCED RECOGNTION OF CERTAIN WAVELENGTHS OF LIGHT

The United States government may have certain rights to this invention under Management and Operating Contract No. DE-AC05-06OR23177 from the Department of Energy.

FIELD OF INVENTION

The invention relates to a device and method utilizing upconverting nanoparticles to provide enhanced recognition of certain wavelengths of light by individuals.

BACKGROUND OF INVENTION

Colorblindness is a condition that affects approximately 7% to 10% of the human population. It is typically attributable to genetic makeup and at the present time there is no known cure. Usually colorblindness does not manifest as the lack of ability to see all colors, but rather manifests as the lack of ability to distinguish colors in the longer wavelengths (lower energy) portion of the visible spectrum. Accordingly, most colorblind individuals are impaired in the ability to see red and/or green colors, but can see colors associated with shorter wavelengths.

Unfortunately, color perception is increasingly required skill in modern jobs. For example, many jobs require the use of lasers for alignment or targeting. The jobs are not only in scientific fields, but also in construction, metal fabrication, farming, surveying and painting, for example.

Additionally, colorblindness impairs an individual's ability to recognize signals such as traffic signals and instrument panel warning lights. Accordingly, some countries restrict a colorblind individual's right to drive a motor vehicle and/or pilot aircraft.

Upconverting nanoparticles are phosphors that absorb light at a first wavelength and emit light at a shorter wavelength in an Anti-Stokes emission process. Many upconverting nanoparticles absorb light in the near IR range and emit light in the visible region. Upconverting nanoparticles have been synthesized using host lattices such as $LaF_3$, $YF_3$, $Y_2O_3$, $LaPO_3$, $NaYF_4$ codoped with trivalent rare earth ions such as $Yb^{+3}$, $Er^{+3}$, and $Tm^{+3}$. The rare earth lanthanide ions doped in crystal centers of the lattice act as absorber ions and emitter ions.

Upconverting nanoparticles have been used for a number of biological assays and imaging applications as the Anti-Stokes emission of upconverting nanoparticles has good photostability under prolonged emission excitation, the emission of the upconverting nanoparticles is a wavelength(s) that is distinguishable from natural fluorescence in biological materials and the upconverting nanoparticles have low toxicity. There are few if any intrinsic biological materials that display upconversion emission, hence interference and artifacts from the biological material are minimized when data is based on emission related to upconverting nanoparticles.

In the prior art the use of upconverting nanoparticles is typically associated with putting the upconverting nanoparticle in a biological material or system to facilitate detection of a component and/or imaging.

Other applications of upconverting nanoparticles include product and/or brand authentication; improvement of efficiency of electronic devices such as improved efficiency of LED lamps, for example; and in renewable energy applications. For example, in renewable energy applications, optical nano-materials have the ability to better utilize the full spectrum of solar radiation which results in an enhanced photovoltaic energy efficiency and more effective use of solar energy.

Accordingly, the prior art has focused on the use of upconverting nanoparticles as tags or for improved efficiency in electronics and photovoltaic applications.

SUMMARY OF INVENTION

The present invention provides an upconverting device for enhanced recognition of selected wavelengths. The device comprises a transparent light transmitter combined with a plurality of upconverting nanoparticles. In some representative embodiments, the upconverting nanoparticles may be coated onto the transparent light transmitter or alternatively embedded in the transparent light transmitter.

In some representative embodiments the device may be incorporated as a lens in eyewear or as a transparent panel or window in an optical instrument or machine.

In use, the upconverting device is positioned between a light source and the eye(s) of the user of the device.

DETAILED DESCRIPTION OF INVENTION

Figure 1A:
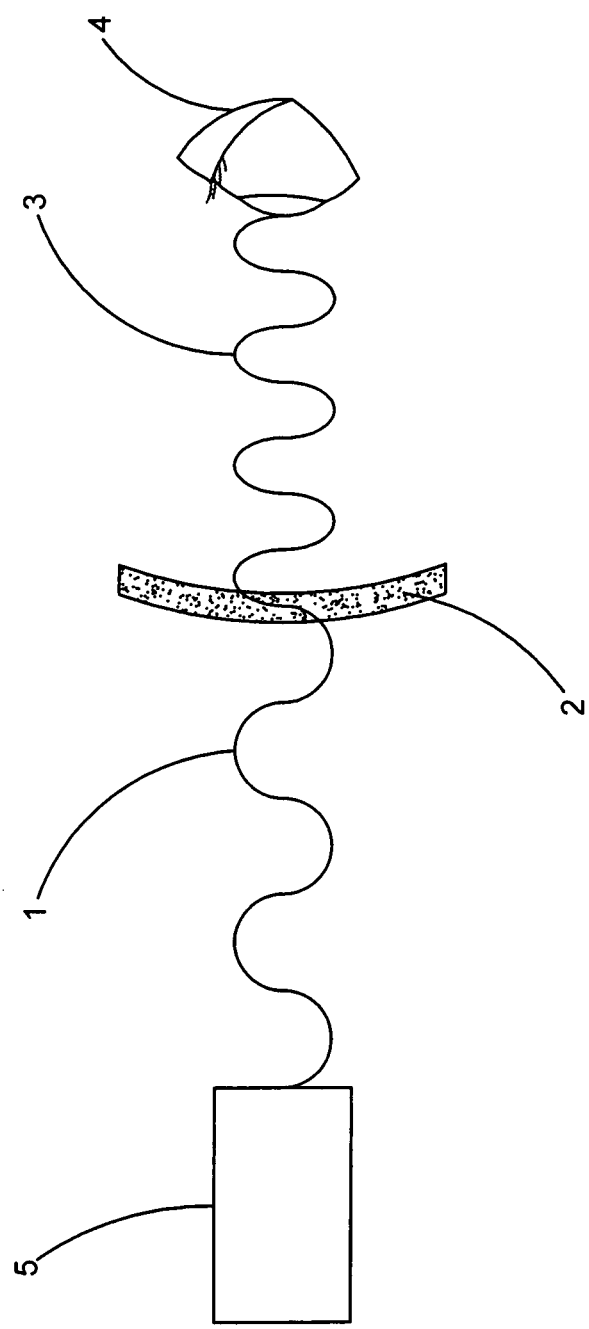
FIGS. 1a and 1b are schematic representations of the upconverting device of the invention in use.

The present invention includes an upconverting device and method for providing enhanced detection of selected wavelengths of light. The upconverting device of the invention can be used by any individual to enhance detection of selected wavelengths. However, the upconverting device is particularly useful for facilitating detection of selected wavelengths of light by colorblind individuals by upconverting a wavelength of light not normally observed by a colorblind individual to a shorter wavelength of light that can be observed by a colorblind individual. In a preferred embodiment for use by colorblind individuals, the invention is used to convert infrared wavelengths and/or red wavelengths and/or green wavelengths of electromagnetic radiation to higher energy shorter wavelength visible light, such as for example, wavelengths in the blue or violet region.

As used herein, visible light means electromagnetic radiation with wavelengths in the range of about 400 nm to about 700 nm. To an individual with normal color vision, wavelengths of light in this range are detected as colors with the specific color depending upon the wavelength(s) of light observed. A colorblind individual is unable to detect a color when exposed light of at least a portion of the wavelengths in the range of about 400 nm to about 700 nm.

The invention is not only useful for converting one wavelength of visible light to a shorter wavelength of visible light that is easier for an individual to detect, but also may be, used for example, to convert wavelengths of light longer than those of visible light such as infrared wavelength to shorter wavelengths of light that are visible as a color.

In one embodiment the invention utilizes upconverting nanoparticles coated or embedded in a transparent light transmitter. The light transmitter may be, for example, a lens or alternatively a transparent panel that is positioned in the line of vision between an individual and a light source. The upconverting nanoparticles absorb light at a first wavelength(s) and emit light at a second shorter higher energy wavelength(s). For example in an embodiment which may be used by an individual having colorblindness in red region of the spectrum, upconverting nanoparticles that absorb light in the red region and emit light at a higher energy shorter wavelength that is visible to the individual would be suitable for use in the upconverting device.

In one embodiment the transparent light transmitter is a lens such as a lens in eyewear. The eyewear may be eyeglasses, safety glasses and/or contact lens. The eyewear may be prescription eyewear used for vision correction or alternatively a lens such as a safety glasses lens that do not have vision correction characteristics. The eyewear lens may be formed or prepared in the conventional manner and coated with a plurality of upconverting nanoparticles. Alternatively, the upconverting nanoparticles may be incorporated or embedded in a transparent light transmitter and the transparent light transmitter with embedded upconverting nanoparticles formed into a lens.

As used herein lens not only includes an eyewear lens but also includes curved surface light transmitters such as, for example, lenses used in optical equipment such as lasers, spectrometers, and microscopes.

The transparent light transmitters are not limited to lenses but also include transparent panels or windows such as, for example, the windows in machine guards or shields or control panels of instrumentation. As used herein a transparent panel or a window is a light transmitter that has a flat surface. The term transparent panel should be taken to include window(s) as used herein. The panel may be formed or prepared in the conventional manner and coated with a plurality of up converting nanoparticles. Alternatively, the upconverting nanoparticles may be incorporated or embedded in a transparent light transmitter and the transparent light transmitter with embedded upconverting nanoparticles formed into a panel.

Optionally, in some embodiments a plurality of layers of nanoparticles may be coated onto the transparent light transmitter. The nanoparticles may be of the same or different types of nanoparticles. Alternatively, a layer of nanoparticles may be coated onto a transparent light transmitter with embedded nanoparticles. The nanoparticles may be of the same or different types of nanoparticles.

Optionally, the transparent light transmitter may be a multiple layered construct with nanoparticles coated and/or embedded on a portion of the multiple layers.

The transparent light transmitter may be selected from any material that transmits the wavelengths absorbed and emitted by the upconverting nanoparticles. Suitable materials include, but are not limited to, glass, polymers, salt crystals and mixtures thereof. Exemplary polymers include, but are not limited to, polyphenol polymers, acrylic polymers, polyethylene polymers, terephthalate polymers, styrene polymers, polycarbonate polymers and mixtures thereof.

Typically the upconverting device will be mounted in a frame or holder. The upconverting devices of the invention may be mounted in conventional frames or holders such as eyewear frames or instrument windows, for example. Any apparatus that the positions the upconverting device in the line of sight between the individual using the device and the light source to be upconverted without blocking transmission is suitable. Holding an unmounted upconverting device in the hand is also within the scope of the invention.

While a solid transparent light transmitters may be useful in many applications, the invention is not limited to solid transparent light transmitters. For example, in some embodiments the transparent light transmitter may be a transparent aerosol, a transparent liquid or a transparent gel. For embodiments in which the transparent light transmitter is a transparent aerosol, a transparent liquid or a transparent gel, the upconverting nanoparticles are dispersed in the transparent medium. Transparent light transmitters that are liquids or gels may be used in flexible light guides, for example.

In another embodiment upconverting nanoparticles are incorporated into a surface that reflects or scatters light (i.e. a light reflecting or scattering surface) forming an upconverting surface. As light of a first wavelength and energy strikes the upconverting surface, the upconverting nanoparticles absorb light at a first energy and a first wavelength and emit light at a second energy and a second wavelength that is higher in energy and shorter in wavelength than the first wavelength. Accordingly, the scattered light includes a selected wavelength(s) visible to an individual and/or easier for the individual to observe.

In one exemplary embodiment the upconverting nanoparticles may be incorporated in a paint or a coating and the paint or coating applied to an object to form an upconverting surface. Paints or coatings with enhanced reflecting properties such as, for example, metallic paints may be particularly useful in some embodiments.

In one exemplary embodiment the upconverting nanoparticles are incorporated in the surface of a glove such as a glove used by laser optics workers. When a laser beam impinges the glove with the upconverting surface, the wavelength of light generated by the laser is upconverted to a wavelength that is perceivable to the observer.

In another exemplary embodiment, the up converting nanoparticles are incorporated in a particulate aerosol such as a fog or smoke. When a laser beam impinges the particulate aerosol with the upconverting nanoparticles, the wavelength of light generated by the laser is upconverted to a wavelength that is perceivable to the observer.

The upconverting nanoparticles may comprise host lattices such as $LaF_3$, $YF_3$, $Y_2O_3$, $LaPO_3$, $NaYF_4$ codoped with trivalent rare earth ions including, but not limited to, $Yb^{+3}$, $Er^{+3}$, and $Tm^{+3}$. The rare earth ions are doped in crystal centers of the lattice. The absorbed and emitted wavelength of light of an upconverting nanoparticle is determined by selection of the lattice, the doping material(s) and the concentration used. Accordingly, a nanoparticle's absorbed and emitted wavelengths can be selected by selecting the type(s) and amount(s) of rare-earth element(s) doped into selected nanoscale materials and numerous combinations with various absorption and emission wavelengths can be produced.

Optionally, it may be desirable to use a plurality of types of nanoparticles in a single upconverting device to provide enhanced detection for multiple wavelengths of light. This may be accomplished, for example, by obtaining and mixing two or more different types of upconverting nanoparticles prior to coating, embedding or dispersing the upconverting nanoparticles in the transparent light transmitter; or alternatively for solid transparent light transmitters by coating the transparent light transmitter with a plurality of layers of nanoparticles or a combination thereof.

Optionally, given the flexibility of manufacture of nanoparticles, the range of emitted wavelengths of potential light sources and variations in color sensitivity of individuals, customization of the wavelength absorbed and wavelength emitted by the upconverting device to a specific application and a specific individual's needs is within the scope of the invention.

Exemplary upconverting nanoparticles suitable for use in the practice of the invention include, but are not limited to, yttrium oxide ($Y_2O_3$) doped with rare earth elements. For example, yttrium oxide ($Y_2O_3$) nanoparticles doped with erbium and yttrium absorb light in the near infrared region at about 980 nm and can emit light as higher energy sorter wavelength photons (i.e. light) in an Anti-Stokes emission.

Another exemplary upconverting nanoparticle is NaYF$_4$:YbEr which absorbs light at infrared light at 980 nm and emits light at 545 nm and is commercially available from Sun Innovation Technology Inc. (43241 Osgood Rd., Fremont, Calif. 94539) as a colloid. These two specific examples of suitable nanoparticles are provided for exemplary purposes, and as one skilled in the art will appreciate that many other upconverting nanoparticles are also suitable.

FIG. 1 shows schematic diagrams of two exemplary embodiments of the upconverting device of the invention in use. Referring to FIG. 1a, light of a first selected wavelength 1 is produced by a light source 5. The light source 5, may be an emitter of visible light such as a laser, for example; a transmitter of selected wavelengths of visible light, such as a red stop light, for example; a reflector of visible light such as a painted surface, for example and/or emitter of infrared light, for example. The light of the first selected wavelength 1 passes into an upconverting lens 2 (i.e. the upconverting device) which has upconverting nanoparticles dispersed and embedded in the upconverting lens 2.

As light of the first selected wavelength 1 interacts with the upconverting nanoparticles embedded and dispersed in the upconverting lens 2, the light is converted to light of a second selected wavelength 3. The light of the second selected wavelength 3 is a shorter wavelength than the light of the first wavelength 1. Accordingly, if the light of the first and the second selected wavelengths 1,3 are in the visible spectrum, when the light strikes a human eye 4, the perceived color of the light will be modified from the color as it was produced by the light source 1. For example, if the light produced by the light source 5 has a first selected visible wavelength of red light, upon interacting with the nanoparticles of the upconverting lens, it will be converted to a shorter wavelength of a different color closer to the blue end of the spectrum. The specific change in color is determined by the characteristics of the nanoparticles used.

Figure 1B:
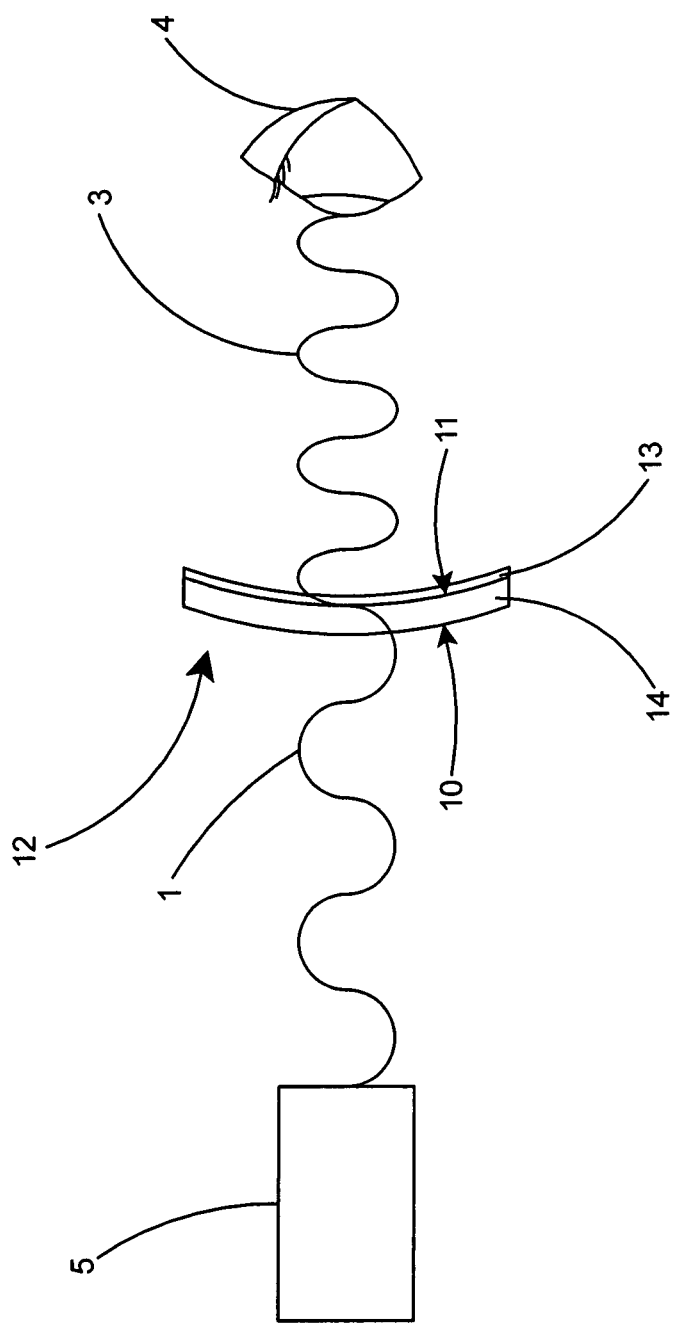

FIG. 1b also shows a schematic diagram of the device of the invention in use. In FIG. 2b the upconverting lens 12 has a lens 14 with a first side 10 and a second side 11. The lens 14 is a conventional eyewear lens. A coating 13 of upconverting nanoparticles is applied to the conventional eyewear lens on the second side 11 to form the upconverting lens 12. In a similar manner as described above, light of a first selected visible wavelength(s) 1 striking the upconverting lens 12 is converted to a second wavelength 3 such that the light of the second selected wavelength 3 is a shorter wavelength than the light of the first wavelength 1. Thus, the perceived color of the light striking the human eye 4 will be modified from the color as it was produced by the light source 5. As shown in FIG. 1b, the coating 13 is on the second side 11. This is exemplary as the coating may be applied to the first side 10, second side 11 or alternatively to both the first and second sides 10, 11.

The invention includes a method for making an upconverting device for enhanced recognition of selected wavelengths. The method comprises contacting or combining a transparent light transmitter and a plurality of upconverting nanoparticles.

The transparent light transmitter may be a lens such as an eyewear lens or a lens in optical equipment, for example or alternatively a transparent panel in a machine guard, control panel, or shield, for example.

In some exemplary embodiments in which the transparent light transmitter is a solid, the transparent light transmitter is formed and then coated with upconverting nanoparticles. Coating may be accomplished by vapor deposition of upconverting nanoparticles on one or more surfaces of the transparent light transmitter, for example. Alternatively, a plurality of upconverting nanoparticles may be dispersed in a solvent and the solvent with dispersed nanoparticles coated onto the transparent light transmitter to form a coated transparent light transmitter, and the solvent evaporated from the coated transparent light transmitter to form the upconverting device, for example.

In some embodiments it may be desirable to apply a plurality of layers of nanoparticles.

In some embodiments, a precursor of the transparent light transmitter and the upconverting nanoparticles are combined to form a composition of transparent light transmitter with embedded or dispersed upconverting nanoparticles. For example, the transparent light transmitter may be provided as a monomer composition and the plurality of upconverting nanoparticles provided dispersed in a solvent. The monomer composition and the upconverting nanoparticles in the solvent are combined and the upconverting nanoparticles distributed in the monomer composition. The combined monomer composition with dispersed upconverting nanoparticles is polymerized with the upconverting nanoparticles embedded in the transparent light transmitter. The transparent light transmitter thus formed can then be fabricated into a lens or a transparent panel.

Optionally, particularly in embodiments for upconverting a plurality of wavelengths, nanoparticles may be embedded in a solid transparent light transmitter and the transparent light transmitter coated with additional upconverting nanoparticles of a different type or types.

The invention further includes a method for enhanced recognition of selected wavelengths. The method comprises providing a transparent light transmitter combined with upconverting nanoparticles, i.e. an upconverting device, and positioning the transparent light transmitter combined with upconverting nanoparticles between a light source and a human user. The upconverting device can be used in any manner that positions the device in between the human user's eyes and the light source. The device may be mounted in conventional eyewear or positioned as a window in machine guarding or shields, or positioned in a light guide, for example. The upconverting device absorbs light of a first wavelength and reemits light at a second wavelength in a frequency to which the human user is more sensitive. While the device may be used by any human with eyesight, it is particularly useful for individuals with partial colorblindness as wavelengths of light which the partially colorblind individual can not see can be converted to wavelengths of a color that the partially colorblind individual can see.

What is at present considered the preferred embodiment and alternative embodiments of the present invention has been shown and described herein. It will be obvious to those skilled in the art that various changes and modifications may be made therein without departing from the scope of the invention as defined by the appended claims.

What is claimed is:

1. An upconverting device for enhanced recognition of selected wavelengths, the device comprising:
   a. a transparent light transmitter, and
   b. a plurality of upconverting nanoparticles, wherein the plurality of upconverting nanoparticles is combined with the transparent light transmitter, wherein the transparent light transmitter comprises eyewear and wherein the upconverting nanoparticles upconvert a wavelength of light unobservable by a colorblind individual to a wavelength of light observable by a colorblind individual.

2. The upconverting device of claim 1, wherein the transparent light transmitter is selected from the group consisting of a lens, a transparent panel, a transparent aerosol, a transparent liquid, a transparent gel and combinations thereof.

3. The upconverting device of claim 1, wherein the transparent light transmitter is positioned between a light source and a human eye.

4. The upconverting device of claim 1, wherein the transparent light transmitter is coated with the plurality of upconverting nanoparticles.

5. The upconverting device of claim 1, wherein the transparent light transmitter comprises a material selected from the group consisting of glass, polymers, salt crystals and mixtures thereof.

6. The upconverting device of claim 5, wherein the transparent light transmitter is a polymer and the polymer is selected from the group consisting of polyphenol polymers, acrylic polymers, polyethylene polymers, terephthalate polymers, styrene polymers, polycarbonate polymers and mixtures thereof.

7. The upconverting device of claim 1, wherein the upconverting nanoparticles absorb light at a first energy and a first wavelength and emit light at a second energy and a second wavelength wherein the second energy is higher than the first energy and the second wavelength is shorter than the first wavelength.

* * * * *